(12) United States Patent
Peled et al.

(10) Patent No.: US 9,892,865 B2
(45) Date of Patent: Feb. 13, 2018

(54) SUPER HYBRID CAPACITOR

(71) Applicant: RAMOT AT TEL AVIV UNIVERSITY LTD., Tel Aviv (IL)

(72) Inventors: Emanuel Peled, Even Yehuda (IL); Meital Goor Dar, Tel Aviv (IL)

(73) Assignee: RAMOT AT TEL AVIV UNIVERSITY LTD., Tel Aviv (IL)

( * ) Notice: Subject to any disclaimer, the term of this patent is extended or adjusted under 35 U.S.C. 154(b) by 185 days.

(21) Appl. No.: 14/433,667

(22) PCT Filed: Sep. 30, 2013

(86) PCT No.: PCT/IB2013/058991
§ 371 (c)(1),
(2) Date: Apr. 5, 2015

(87) PCT Pub. No.: WO2014/060886
PCT Pub. Date: Apr. 24, 2014

(65) Prior Publication Data
US 2015/0279575 A1    Oct. 1, 2015

Related U.S. Application Data

(60) Provisional application No. 61/714,826, filed on Oct. 17, 2012.

(51) Int. Cl.
*H01G 11/04* (2013.01)
*H01G 11/62* (2013.01)
(Continued)

(52) U.S. Cl.
CPC ............ *H01G 11/04* (2013.01); *H01G 11/02* (2013.01); *H01G 11/62* (2013.01); *H01G 11/64* (2013.01);
(Continued)

(58) Field of Classification Search
CPC ........ H01G 11/04; H01G 11/02; H01G 11/62; H01G 11/64; H01G 11/24; H01G 11/86; Y10T 29/417; Y02E 60/13
See application file for complete search history.

(56) References Cited

U.S. PATENT DOCUMENTS 4,882,241 A * 11/1989 Heinzel ................... H01M 4/90
429/107
5,429,893 A * 7/1995 Thomas ................. H01G 9/155
361/502
(Continued)

FOREIGN PATENT DOCUMENTS

| CN | 101414691 A | 4/2009 |
| CN | 102176380 A | 9/2011 |
| EP | 1328036 A1 | 7/2003 |

OTHER PUBLICATIONS

European Application # 13847621.3 Search Report dated Jun. 7, 2016.
(Continued)

*Primary Examiner* — Dion R Ferguson
(74) *Attorney, Agent, or Firm* — D. Kligler I.P. Services LTD

(57) ABSTRACT

A double-layer capacitor (DLC) (10), including an electrolyte (20) having an electrochemically active species (28) dissolved therein. The electrochemically active species consists of a material that undergoes oxidation at one electrode and undergoes reduction at another electrode during charge and discharge processes of the DLC. The DLC also includes first and second electrodes (12, 14), consisting of a porous material (18, 26) in contact with the electrolyte. There is a porous separator (16) in the electrolyte separating the first electrode from the second electrode.

19 Claims, 1 Drawing Sheet

(51) Int. Cl.
*H01G 11/64* (2013.01)
*H01G 11/02* (2013.01)
H01G 11/24 (2013.01)
H01G 11/86 (2013.01)

(52) U.S. Cl.
CPC .............. *H01G 11/24* (2013.01); *H01G 11/86* (2013.01); *Y02E 60/13* (2013.01); *Y10T 29/417* (2015.01)

(56) References Cited

U.S. PATENT DOCUMENTS

| | | | |
|---|---|---|---|
| 5,841,627 A | 11/1998 | Prakash et al. | |
| 6,426,862 B1 | 7/2002 | Vasechkin | |
| 6,671,166 B1* | 12/2003 | Penneau | H01G 9/038 29/25.03 |
| 8,094,433 B2 | 1/2012 | Tian et al. | |
| 2002/0080553 A1 | 6/2002 | Pekala | |
| 2007/0104981 A1 | 5/2007 | Lam et al. | |
| 2008/0180882 A1 | 7/2008 | Miller et al. | |
| 2008/0199737 A1 | 8/2008 | Kazaryan et al. | |
| 2010/0003545 A1 | 1/2010 | Horne et al. | |
| 2010/0047671 A1* | 2/2010 | Chiang | B60L 11/1879 429/50 |
| 2011/0189507 A1 | 8/2011 | Reis et al. | |
| 2011/0242730 A1 | 10/2011 | Zhou et al. | |
| 2011/0249373 A1* | 10/2011 | Farahmandi | H01G 11/02 361/502 |
| 2012/0021290 A1 | 1/2012 | Hong | |
| 2012/0169298 A1 | 7/2012 | Martin | |
| 2012/0249089 A1* | 10/2012 | Risser | H01G 11/36 320/167 |
| 2013/0055559 A1* | 3/2013 | Slocum | H01M 4/0478 29/623.1 |
| 2015/0062777 A1* | 3/2015 | Stucky | H01G 11/36 361/502 |

OTHER PUBLICATIONS

International Application # PCT/IB2013/058991 Search Report dated Jan. 15, 2014.
Wills et al., "Developments in the soluble lead-acid flow battery", Journal of Applied Electrochemistry, vol. 40, Issue 5, pp. 955-965, May 2010.
Collins et al., "A novel flow battery: A lead acid battery based on an electrolyte with soluble lead(II). Part IX: Electrode and electrolyte conditioning with hydrogen peroxide", Journal of Power Sources 195, pp. 2975-2978, 2010.
Collins et al., "A novel flow battery: A lead acid battery based on an electrolyte with soluble lead(II) Part VIII. The cycling of a 10 cm×10cm flow cell", Journal of Power Sources 195, pp. 1731-1738, 2010.
Li et al., "A Novel Flow Battery: A Lead Acid Battery Based on an electrolyte with soluble lead(II). Part VII. Further Studies of the Lead Dioxide Positive Electrode", Electrochimica Acta 54, pp. 4688-4695, 2009.
Pletcher et al., "A Novel Flow Battery—A Lead-Acid Battery Based on an Electrolyte With Soluble Lead(II). V. Studies of the Lead Negative Electrode", Journal of Power Sources 180, pp. 621-629, 2008.
Hazza et al., "A novel flow battery—a lead acid battery based on an electrolyte with soluble lead(II) IV. The influence of additives", Journal of Power Sources 149, pp. 103-111, 2005.
Hazza et al., "A novel flow battery: A lead acid battery based on an electrolyte with soluble lead(II)", Part I. Preliminary studies, Physical Chemistry Chemical Physics, vol. 6, pp. 1773-1778, 2004.
Pletcher et al., "A novel flow battery—A lead-acid battery based on an electrolyte with soluble lead(II) Part VI. Studies of the lead dioxide positive electrode", Journal of Power Sources 180, pp. 630-634, 2008.
Peled et al., "A Novel Proton-Conducting Membrane", Electrochemical and Solid-State Letters, vol. 1, No. 5, pp. 210-211, 1998.
Pletcher et al., "A novel flow battery—A lead acid battery based on an electrolyte with soluble lead(II) III. The influence of conditions on battery performance", Journal of Power Sources 149, pp. 96-102, 2005.
Pletcher et al., "A novel flow battery: A lead acid battery based on an electrolyte with soluble lead(II) Part II. Flow cell studies", Physical Chemistry Chemical Physics, vol. 6, pp. 1779-1785, 2004.

* cited by examiner

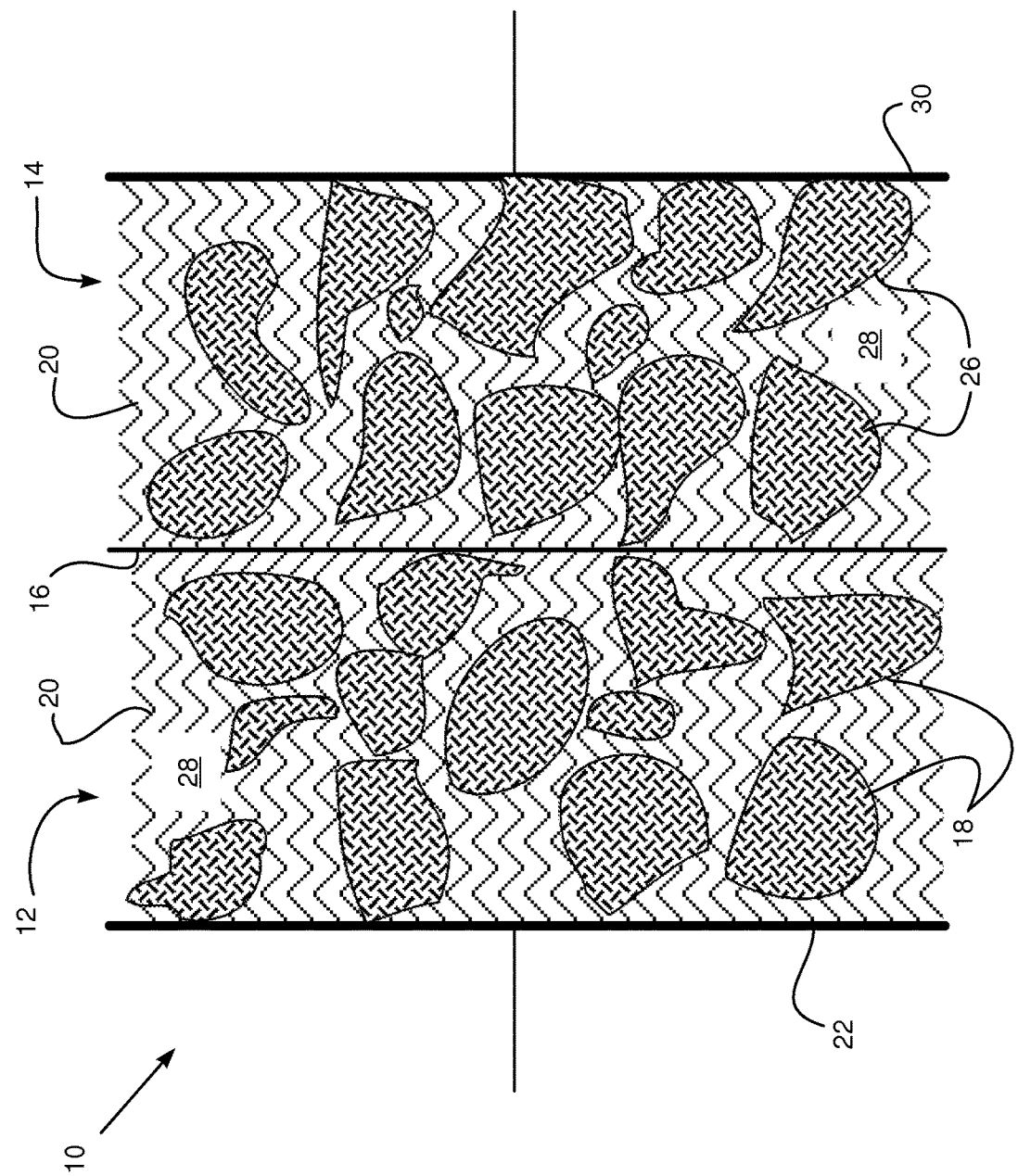

SUPER HYBRID CAPACITOR

CROSS-REFERENCE TO RELATED APPLICATION

This application claims the benefit of U.S. Provisional Patent Application 61/714,826, filed 17 Oct. 2012, which is incorporated herein by reference.

FIELD OF THE INVENTION

The present invention relates generally to electrical capacitors, and specifically to double layer electrical capacitors.

BACKGROUND OF THE INVENTION

In the present description, for clarity and where appropriate, double layer capacitors (DLCs) are referred to as non-hybrid DLCs or hybrid DLCs.

A typical non-hybrid DLC consists of two high surface area electrodes (typically activated charcoal electrodes) immersed in an electrolyte such as an acid or other electrolyte. The electrolytes are typically aqueous, but may be non-aqueous. The two high surface electrodes are separated by an extremely thin and porous separator. On charge ions are adsorbed onto the high surface area electrodes, anions on the positive electrode and cations onto the negative electrode. On discharge the ions desorb from the electrodes. A typical acid type DLC provides close to one million charge/discharge cycles and stores about 1.5 Wh per kg of DLC.

In order to increase the energy stored in a DLC, hybrid systems, having the characteristics of a capacitor and the characteristics of a rechargeable battery, have been developed. For example, U.S. Patent Application 2008/0199737 to Kazaryan et al., whose disclosure is incorporated herein by reference, describes a hybrid lead-acid battery/electrochemical capacitor electrical energy storage device.

Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

SUMMARY OF THE INVENTION

An embodiment of the present invention provides a double-layer capacitor (DLC), including:

an electrolyte, having an electrochemically active species dissolved therein, the electrochemically active species consisting of a material that undergoes oxidation at one electrode and undergoes reduction at another electrode during charge and discharge processes of the DLC;

first and second electrodes, consisting of a porous material in contact with the electrolyte; and a porous separator in the electrolyte separating the first electrode from the second electrode.

Typically, in addition to the electrochemically active species the electrolyte includes an electrochemically inactive species dissolved therein, the electrochemically inactive species consisting of a material that neither oxidizes nor reduces during the charge and discharge processes of the DLC. The electrochemically inactive species may consist of at least one of an acid, a salt, an acid/salt mixture, an alkali metal salt of perchloric acid, an alkali metal salt of nitric acid, an alkali metal salt of tetrafluoroboric acid or an alkali metal salt of methanesulfonic acid.

In a disclosed embodiment the electrochemically active species includes a soluble lead salt providing $Pb^{2+}$ ions to the electrolyte. Typically, the DLC has a polarity and a reverse polarity implemented after at least one charge/discharge cycle of the DLC.

In a further disclosed embodiment the electrochemically active species includes a soluble chromium salt providing at least one of $Cr^{3+}$ ions or a $Cr^{3+}$ complex to the electrolyte.

In a yet further disclosed embodiment during the charge and discharge processes of the DLC only a liquid state to a liquid state transition occurs, so that the electrochemically active species remains in the electrolyte.

In an alternative embodiment, during the charge and discharge processes of the DLC at least one of a liquid state to a solid state transition and a solid state to a liquid state transition occurs.

Typically, the separator is configured to selectively slow transport of the electrochemically active species between the first and the second electrodes. Separator-material of the separator may be selected from a group consisting of glass, ion conducting membranes, proton exchange membranes (PEMs), proton conducting membranes (PCMs), and nano-porous PCMs (NP-PCMs).

In a further alternative embodiment the electrolyte includes at least one of a $Cu^{+2}$ salt, a $Pb^{+2}$ salt, MSA, $HBF_4$, $HClO_4$, an alkali metal salt of MSA, an alkali metal salt of $HBF_4$, an alkali metal salt of $HClO_4$, or an alkali metal acetate.

The electrolyte may be aqueous. Alternatively, the electrolyte may be non-aqueous.

In a yet further alternative embodiment the material includes a single electrochemically active species that undergoes oxidation at the first electrode and that undergoes reduction at the second electrode.

In one embodiment the material includes a first electrochemically active species that undergoes oxidation at the first electrode and a second electrochemically active species that undergoes reduction at the second electrode.

There is further provided, according to an embodiment of the present invention, a method for forming a double-layer capacitor (DLC), including:

dissolving an electrochemically active species within an electrolyte, the electrochemically active species consisting of a material that undergoes oxidation at one electrode and undergoes reduction at another electrode during charge and discharge processes of the DLC;

forming first and second electrodes, consisting of a porous material, to be in contact with the electrolyte; and separating the first electrode from the second electrode by a porous separator in the electrolyte.

The Detailed Description of Embodiments below is to be read in conjunction with the drawing, a brief description of which follows.

BRIEF DESCRIPTION OF THE DRAWING

FIG. 1 is a schematic diagram of a hybrid double layer capacitor, according to an embodiment of the present invention.

DETAILED DESCRIPTION OF EMBODIMENTS

Overview

Embodiments of the present invention provide two versions of low-cost and novel super hybrid electrical capacitors, comprising a double layer capacitor (DLC) having one or more electrochemically active species in the electrolyte.

A high power version is expected to store 3 to 8 times more energy per volume or energy per weight than comparable DLCs known in the art, at a cost close to that of the prior art DLCs. The high power version has a long life and a fast response.

A high energy version is expected to store 8 to 15 times more energy per volume or energy per weight than comparable DLCs known in the art, also at a cost close to that of the prior art DLCs. The high energy version has a long life, which, however, may be shorter than that of the high power version.

DETAILED DESCRIPTION

Reference is now made to FIG. 1, which is a schematic diagram of a hybrid double layer capacitor (DLC) 10, according to an embodiment of the present invention. DLC 10 comprises a first electrode 12, a second electrode 14, and a separator 16 separating the two electrodes. First electrode 12 is formed of a first solid, high surface area, porous conductor 18, contacted by and immersed in a first liquid or gel electrolyte 20. Electrolyte 20 fills pores of separator 16, which is enclosed by an electrode plate 22, the plate acting as a current collector. Second electrode 14 is substantially similar in construction to the first electrode, comprising a second solid, high surface area, porous conductor 26, contacted by and immersed in electrolyte 20 and enclosed by a second conducting electrode plate 30. Plate 30 acts as a current collector. Typically, first and second solid conductors 18, 26, are formed of the same porous material, typically a high surface area carbon material such as activated charcoal or carbon nano tube (CNT).

Electrolyte 20 is herein assumed, by way of example, to be an aqueous based electrolyte, although embodiments of the present invention may comprise non-aqueous based electrolytes such as acetonitrile. In addition to the water that acts as a base material of the electrolyte, an electrochemically active species 28 is dissolved in the electrolyte. As is known in the art, an electrochemically active species comprises a material that oxidizes or reduces during electrolysis (involving charge or discharge of the DLC). Instances of electrochemically active species 28 used in DLC 10 are described in the examples provided below.

In contrast to electrochemically active species, an electrochemically inactive species comprises ions that neither oxidize nor reduce during charge or discharge of the DLC. For example, an electrochemically inactive species may comprise sulfuric acid $H_2SO_4$ (aq), hydrochloric acid HCl (aq), nitric acid $HNO_3$ (aq), tetrafluoroboric acid $HBF_4$ (aq), or methanesulfonic acid (MSA) $CH_3SO_3H$ (aq), alkali metal salts of these or other acids, or mixtures of inactive salts with their respective acids. Other examples of electrochemically inactive species include, but are not limited to, bases and neutral solution. As is illustrated in the examples below, electrolyte 20 may also comprise an electrochemically inactive species in addition to the active species.

In the example hybrid DLCs described below, first electrode 12 is considered to be the positive electrode, and second electrode 14 is considered to be the negative electrode. Porous conductors 18, 26 are assumed to comprise high surface carbon material, and current collectors 22, 30 are assumed to comprise an inert conductor such as composite carbon, composite graphite, stainless steel, or nickel. Separator 16 may be formed of any suitable separating material having high permeability and porosity that is electrochemically stable and that is electronically nonconductive.

In some embodiments, the separator comprises an ion selective membrane that selectively slows the transport of the electrochemically active species through the separator. Examples of suitable separator materials are glass separators, ion conducting membranes, proton exchange membranes (PEMs), proton conducting membranes (PCMs), and nanoporous PCMs (NP-PCMs). NP-PCMs are described in an article titled "A novel proton-conducting membrane" by E. Peled, T. Duvdevani, and A. Melman, Electrochemical and Solid-State Letters., 1 (5), (1998) 210-211. The article is incorporated herein by reference.

DLC Example 1

In this first example, electrochemically active species 28 comprises a soluble lead salt, such as lead perchlorate $Pb(ClO_4)_2$, lead nitrate $Pb(NO_3)_2$, lead tetrafluoroborate $Pb(BF4)_2$, or lead methanesulfonate $Pb(CH_3SO_3)_2$, providing $Pb^{+2}$ ions in electrolyte 20. Typically, the soluble lead salt is in combination with its respective acid, or an alkali metal salt or mixture of alkali metal salts and the acid, which are an electrochemically inactive species. The salt may respectively be in combination with perchloric acid, nitric acid, tetrafluoroboric acid, or methanesulfonic acid.

During charge, $Pb^{+2}$ ions, dissolved in electrolyte 20, reduce to solid metallic Pb which deposits as a very thin layer on the high surface area carbon electrode at negative electrode 14. In parallel cations adsorb on the surface of the electrode. The $Pb^{+2}$ ions also oxidize to solid $PbO_2$ that deposits as a thin layer on the surface area of the positive electrode 12, and in parallel anions adsorb on the surface of this electrode. The voltage of the DLC during charge (from a discharged state) increases from approximately 0.5-1 V to 1.8 up to more than 2 V. During discharge, the solid Pb oxidizes to dissolved $Pb^{+2}$ ions, and $Pb^{+4}$ ions from the solid $PbO_2$ reduce to dissolved $Pb^{+2}$ ions.

It will be understood that at both electrodes there is a liquid→solid or solid→liquid state transition in addition to the adsorption/desorption of ions from the solution on the solid high surface electrodes. Thus, on charge, $Pb^{+2}$ from the liquid→Pb in the solid at the negative electrode, and $Pb^{+2}$ from the liquid→$Pb^{+4}$ in the solid at the positive electrode. On discharge, the state transitions reverse, so that at both electrodes there are solid→liquid state transitions. Thus, there are only liquid→solid or solid→liquid state changes during operation of the DLC. This is in contrast to solid A to solid B transitions that take place in conventional batteries such as nickel-cadmium and lead acid. A soluble lead DLC of the present invention can be run at lower power and higher energy with no addition of any inactive species.

A hybrid DLC of example 1 was assembled having an electrochemically active species 28 comprising 1.5M $Pb(MSA)_2$ and an electrochemically inactive 0.3M MSA. A 170 μm NP-PCM was used for separating the first electrode from the second electrode. The electrodes were made of the same material; commercially available porous paper SGL GDL25AA coated by a micro-porous layer composed of carbon powder as carbon black or as XC72, and 5-20% wt PVDF as a binder. Each electrode diameter was 260 μm with approximately 4 mg Carbon/$cm^2$. The separator and both electrodes were saturated with the above electrolyte, and then were sandwiched between two current collectors plates made of graphite.

The cell was cycled, i.e., charged and discharged, at a current density of 5 mA/cm² using a Maccor battery tester operating between the voltage ranges of 1.2-2.2V. The cell showed over 140 stable cycles with a discharge capacity of about 2 mAh.

Another example of a hybrid DLC cell using the same electrolyte but with a thinner separator of 60 μm NP-PCM and with approximately 2 mg Carbon/cm² of MPL composed of Black Pearl carbon type was cycled over 250 stable cycles with a discharge capacity of about 1.4 mAh. The cell operated between the voltage ranges of 1.4-2.3V at a current density of 10 mA/cm² and 5 mA/cm² for charge and discharge respectively.

Similar DLC cells were cycled with electrolyte comprised of 0.5 to 1.5M $Pb(ClO_4)_2$, an electrochemically inactive 0.1 to 0.3M MSA, and 0.1 to 1M potassium or sodium salts of MSA or perchlorate. The DLC energy increases with the increase of the $Pb^{+2}$ content of the electrolyte. The inventors believe that DLCs with a low content of acid and a higher content of alkali metal salts demonstrated better durability in comparison to DLCs containing high acid content.

Due to possible formation of hydrogen gas and oxygen gas at the end of charge and possible formation of a less active $PbO_2$ phase the electrodes of the soluble lead DLC may become unbalanced with respect to their capacity. Typically, in order to balance the electrodes it may be advantageous to reverse the cell polarity (after charge depletion), either after each cycle or after several cycles.

DLC Example 2

The electrodes of the hybrid DLC cell of example 2 are similar to those used in Example 1, The separator type was 150 microns thick NP-PCM and the aqueous solution contains 0.15M chromium EDTA complex as the electrochemically active species and 0.8M sodium acetate, which is electrochemically inactive. The cell was cycled using a Maccor Battery tester with charging to 2.5-2.8V at 2-5 mA/cm² and discharging to 0.8-1V at 1-3 mA/cm², and delivered 0.05 to 0.2 mAh. The cell current efficiency may be lower than 100% due to possible side reactions of oxygen and hydrogen evolution during charge.

Due to a possible oxidation of $Cr^{+2}$ by oxygen this DLC has an air tight packaging.

During charge, $Cr^{+3}$ ions at the negative electrode reduce to soluble $Cr^{+2}$ ions some of which adsorb at the electrode high surface area, and $Cr^{+3}$ ions at the positive electrode oxidize to soluble $Cr^{+5}$ ions and the anions adsorb at the electrode high surface area. During discharge the dissolved and adsorbed $Cr^{+2}$ ions oxidize to dissolved $Cr^{+3}$ ions, and the dissolved $Cr^{+5}$ ions reduce to dissolved $Cr^{+3}$ ions and the anions are desorbed from the electrode.

In this example, apart from the adsorption-desorption processes, the only state transitions associated with the redox species are liquid→liquid state transitions during charge or discharge, i.e., there are no solid state changes during operation of the DLC.

Typically, in both hybrid DLC examples described above, the concentration of the electrochemically active species in electrolyte 20 may be up to saturation. In some embodiments, a typical concentration of active species 28 is in an approximate range of 0.1 to 5 molar.

A typical concentration of the inactive species, where present, is in an approximate range of 0.001 to 7 molar.

DLC Example 1 and DLC Example 2 are instances of hybrid DLCs having an energy density greater than $$6\text{-}10 \ \frac{Wh}{kg}$$

(measured on the basis of the cell mass, excluding the packaging), which is a factor of 3-5 greater than prior art DLCs. In addition, these hybrid DLCs have a high power capability, and long life.

The hybrid DLCs instanced by DLC Example 1 and DLC Example 2 may be assembled and operated at room temperature.

DLC Example 3

A third hybrid DLC example is generally similar in composition to DLC Example 1 described above, using similar electrodes and separator types, except for the following differences:

The hybrid DLC cell uses a non-aqueous electrolyte, in this case acetonitrile. The electrochemically active species 28 comprises an acetonitrile solution of 0.4M chromium EDTA complex as the electrochemically active species and 0.4M TEABF4 which is an electrochemically inactive species. Due to a possible oxidation of $Cr^{+2}$ by oxygen this DLC has an air tight packaging.

The cell was tested using a Maccor Battery tester with charging to 2.8 to 3.3V and discharging to 1 to 1.4V, and operated at current densities of 0.5 to 2 mA/cm². It delivered 0.1 to 0.3 mAh.

DLC Example 4

A fourth hybrid DLC example is generally similar in composition to DLC Example 1 described above, using similar electrodes and separator types, except for the following differences:

In this example the electrolyte was 0.4M $Cu(MSA)_2$+0.4M $Pb(MSA)_2$+0.8M MSA.

The cell was cycled (charged/discharged) at 1-10 mA/cm², at voltages between 0.8 and 1.9V and operated at current densities of 0.5 to 2 mA/cm². It delivered 0.2-0.7 mAh.

In this example, there are two electrochemically active species: $Cu(MSA)_2$ and $Pb(MSA)_2$. In DLC operation, $Cu^{+2}$ is reduced and $Pb^{+2}$ is oxidized.

On charge a thin layer of copper is deposited on the high surface area of the negative electrode and $Pb^{+2}$ oxidized to solid $PbO_2$ which deposited as a thin layer on the high surface area of the positive electrode. In parallel ions are adsorbed on the two electrodes. On discharge all reactions go in the opposite direction.

The description above provides examples of components that may be used in hybrid DLCs, including examples of the electrochemically active species used in the electrolyte of the DLC. While the examples above, for simplicity, assume that one electrochemically active species is used in the electrolyte, there is no such limitation for embodiments of the present invention, so that two or more electrochemically active species may be used in the electrolyte.

Electrochemical active species other than those referred to above may be used in embodiments of the present invention, for example lead chloride or lead bromide. In general such species are typically derived from suitable organic or inorganic redox couples. In addition, while electrolyte 20 is typically formulated as a liquid, this should not be construed as a limitation, and the electrolyte may be in the form of a gel. Such a gel may be formed by the addition to the electrolyte of up to approximately 2% of any convenient gelling powder known in the art.

What is claimed is:

1. A double-layer capacitor (DLC), comprising:
   a liquid or gel electrolyte, comprising an electrochemically active species dissolved therein, the electrochemically active species comprising a material that undergoes oxidation at one electrode and undergoes reduction at another electrode during charge and discharge processes of the DLC;
   first and second solid electrodes, each electrode comprising a solid porous material in contact with the electrolyte; and
   a porous separator in the electrolyte separating the first solid electrode from the second solid electrode;
   wherein the electrochemically active species comprises:
   a first electrochemically active species that undergoes oxidation at the first electrode on charge and reduction at the first electrode on discharge, and
   a second electrochemically active species that undergoes reduction at the second electrode on charge and oxidation at the second electrode on discharge.

2. The DLC according to claim 1, wherein, in addition to the first and the second electrochemically active species the electrolyte comprises an electrochemically inactive species dissolved therein, the electrochemically inactive species comprising a material that neither oxidizes nor reduces during the charge and discharge processes of the DLC.

3. The DLC according to claim 2, wherein the electrochemically inactive species comprises at least one of an acid, a salt, an acid/salt mixture, an alkali metal salt of perchloric acid, an alkali metal salt of nitric acid, an alkali metal salt of tetrafluoroboric acid or an alkali metal salt of methanesulfonic acid.

4. The DLC according to claim 1, wherein the first electrochemically active species comprises a soluble lead salt providing Pb2+ ions to the electrolyte.

5. The DLC according to claim 4, the DLC having a polarity and a reverse polarity implemented after at least one charge/discharge cycle of the DLC.

6. The DLC according to claim 1, wherein during the charge and discharge processes of the DLC at least one of a liquid state to a solid state transition and a solid state to a liquid state transition occurs.

7. The DLC according to claim 1, wherein the separator is configured to selectively slow transport of the first and the second electrochemically active species between the first and the second electrodes.

8. The DLC according to claim 7, wherein separator-material of the separator is selected from a group consisting of glass, ion conducting membranes, proton exchange membranes (PEMs), proton conducting membranes (PCMs), and nanoporous PCMs (NP-PCMs).

9. The DLC according to claim 1, wherein the electrolyte comprises at least one of a $Cu^{+2}$ salt, a $Pb^{+2}$ salt, MSA, $HBF_4$, $HClO_4$, an alkali metal salt of MSA, an alkali metal salt of $HBF_4$, an alkali metal salt of $HClO_4$, or an alkali metal acetate.

10. The DLC according to claim 1, wherein the electrolyte is aqueous.

11. The DLC according to claim 1, wherein the electrolyte is non-aqueous.

12. A method for forming a double-layer capacitor (DLC), comprising:
   dissolving an electrochemically active species within a liquid or gel electrolyte, the electrochemically active species comprising a material that undergoes oxidation at one electrode and undergoes reduction at another electrode during charge and discharge processes of the DLC;
   forming first and second solid electrodes, each electrode comprising a solid porous material, to be in contact with the electrolyte; and
   separating the first solid electrode from the second solid electrode by a porous separator in the electrolyte;
   wherein the electrochemically active species comprises:
   a first electrochemically active species that undergoes oxidation at the first electrode on charge and reduction at the first electrode on discharge, and
   a second electrochemically active species that undergoes reduction at the second electrode on charge and oxidation at the second electrode on discharge.

13. The method according to claim 12, wherein, in addition to the first and the second electrochemically active species the electrolyte comprises an electrochemically inactive species dissolved therein, the electrochemically inactive species comprising a material that neither oxidizes nor reduces during the charge and discharge processes of the DLC.

14. The method according to claim 12, wherein the first electrochemically active species comprises a soluble lead salt providing Pb2+ ions to the electrolyte.

15. The method according to claim 14, and comprising reversing a polarity of the DLC after at least one charge/discharge cycle of the DLC.

16. The method according to claim 12, wherein during the charge and discharge processes of the DLC at least one of a liquid state to a solid state transition and a solid state to a liquid state transition occurs.

17. The method according to claim 12, and configuring the separator to selectively slow transport of the first and the second electrochemically active species between the first and the second electrodes.

18. The method according to claim 12, wherein the electrolyte comprises at least one of a $Cu^{+2}$ salt, a $Pb^{+2}$ salt, MSA, $HBF_4$, $HClO_4$, an alkali metal salt of MSA, an alkali metal salt of $HBF_4$, or an alkali metal salt of $HClO_4$.

19. The method according to claim 12, wherein the electrolyte is aqueous.

* * * * *